US010560432B1

(12) United States Patent
Moore (10) Patent No.: US 10,560,432 B1
(45) Date of Patent: Feb. 11, 2020

(54) CENTRALIZED MANAGEMENT OF REMOTE ENDPOINT DEVICES (71) Applicant: Amazon Technologies, Inc., Seattle, WA (US)

(72) Inventor: Scott Moore, Kyle, TX (US)

(73) Assignee: Amazon Technologies, Inc., Seattle, WA (US)

( * ) Notice: Subject to any disclaimer, the term of this patent is extended or adjusted under 35 U.S.C. 154(b) by 312 days.

(21) Appl. No.: 15/618,576

(22) Filed: Jun. 9, 2017

(51) Int. Cl.
H04L 29/06 (2006.01)
G06F 8/61 (2018.01)
G06F 9/48 (2006.01)

(52) U.S. Cl.
CPC ............ H04L 63/0272 (2013.01); G06F 8/61 (2013.01); G06F 9/4862 (2013.01)

(58) Field of Classification Search
None
See application file for complete search history.

(56) References Cited

U.S. PATENT DOCUMENTS

| 8,463,885 | B2 | 6/2013 | DeHaan |
| 8,726,263 | B2 | 5/2014 | Rangarajan et al. |
| 8,910,155 | B1* | 12/2014 | Sobel ............... G06F 9/445 718/1 |
| 8,997,244 | B2 | 3/2015 | Fang et al. |
| 9,298,445 | B1 | 3/2016 | Chirhart |
| 9,432,392 | B2 | 8/2016 | Ali-Ahmad et al. |
| 2013/0311583 | A1* | 11/2013 | Humphreys ............ H04L 51/14 709/206 |
| 2013/0332561 | A1* | 12/2013 | Jones ................ G06F 16/24564 709/217 |
| 2014/0047081 | A1* | 2/2014 | Edwards ................ G06Q 10/10 709/220 |

(Continued)

OTHER PUBLICATIONS

Ana Visneski, "User Network-to-Amazon VPC Connectivity for Applications Hosted on AWS," AWS Blog, Amazon.com, Jan. 2017, Retrieved from URL: https://aws.amazon.com/blogs/aws/user-network-to-amazon-vpc-connectivity-for-applications-hosted-on-aws/, pp. 1-6.

(Continued)

Primary Examiner — Shin-Hon (Eric) Chen
(74) Attorney, Agent, or Firm — Robert C. Kowert; Kowert, Hood, Munyon, Rankin & Goetzel, P.C.

(57) ABSTRACT

Methods, systems, and computer-readable media for centralized management of remote endpoint devices are disclosed. Instances of agent software are installed on endpoint devices that are external to a multi-tenant provider network. The agent software is communicatively coupled to a centralized management service of the multi-tenant provider network. A software package is selected from a marketplace service of the multi-tenant provider network. The marketplace service comprises product offerings for a plurality of software packages. The centralized management service sends information indicative of a configuration associated with the software package to the agent software of one or more of the endpoint devices that are associated with the software package. The centralized management service receives, from the agent software, an indication that the configuration has been deployed on the one or more of the endpoint devices.

20 Claims, 9 Drawing Sheets (56) References Cited

U.S. PATENT DOCUMENTS

| | | | |
|---|---|---|---|
| 2015/0120818 A1* | 4/2015 | Kim | G06F 9/45558 |
| | | | 709/203 |
| 2015/0131674 A1* | 5/2015 | Kao | H04L 61/2596 |
| | | | 370/420 |
| 2016/0124735 A1* | 5/2016 | Dingsor | G06F 8/60 |
| | | | 717/177 |
| 2016/0277251 A1* | 9/2016 | Dempo | H04L 12/4641 |

OTHER PUBLICATIONS

Ana Visneski, "Ready-to-Run Solutions: Open Source Software in AWS Marketplace," AWS Blog, Amazon.com, Jan. 2017, Retrieved from URL: https://aws.amazon.com/blogs/aws/ready-to-run-solutions-open-source-software-in-aws-marketplace/, Pages.

Jeff Barr, "New—Product Support Connection for AWS Marketplace Customers," AWS Blog, Amazon.com, Nov. 2016, Retrieved from URL: https://aws.amazon.com/blogs/aws/new-product-support-connection-for-aws-marketplace-customers/, pp. 1-6.

Jeff Barr, "Amazon WorkSpaces is Now Available," AWS Blog, Amazon.com, Mar. 2014, Retrieved from URL: https://aws.amazon.com/blogs/aws/amazon-workspaces-now-available/, pp. 1-8.

Jeff Barr, "New AWS Directory Service," AWS Blog, Amazon.com, Oct. 2014, Retrieved from URL: https://aws.amazon.com/blogs/aws/new-aws-directory-service/, pp. 1-6.

* cited by examiner

CENTRALIZED MANAGEMENT OF REMOTE ENDPOINT DEVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. Such resources at data centers, when accessed by remote customers, may be said to reside "in the cloud" and may be referred to as cloud computing resources.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for centralized management of remote endpoint devices are described. Using the techniques described herein, endpoint devices outside of a provider network may be managed securely and efficiently using a centralized management service inside the provider network. At a given time, the centralized management service may be used by multiple clients to manage devices associated with respective client organizations. The centralized management service may be integrated with other services of the provider network (e.g., services offering various types of functionality and/or resources) and may invoke the functionality of those services in managing the endpoints. In one embodiment, the provider network may include a marketplace service that offers various product offerings such as software packages for purchase or license. An administrator associated with the endpoints may use the marketplace to select software for deployment within the provider network or on the endpoints. For example, a virtual private network (VPN) server may be selected and deployed, e.g., within a virtual private cloud (VPC) in the provider network or within a private network associated with the endpoints. The centralized management service may configure the endpoints for secure tunneling to the VPN server (or another private network) using agent software installed on the endpoints. The agent software may also be used to install software on the endpoints, e.g., as selected in the marketplace service. In one embodiment, the agent software may report status updates and other information descriptive of the endpoints, and the endpoint data may be aggregated at the centralized management service for presentation in a user interface. Endpoints may be assigned to groups for ease of management, e.g., such that configuration changes or software updates may be deployed only to a select set of endpoints and not to other endpoints under the management of an organization. In one embodiment, the agent software may assist in the migration of endpoints to compute instances hosted in the provider network. Using these techniques, integrated services of a provider network may be used for efficient management of remote computing devices that are external to that provider network.

Figure 1:
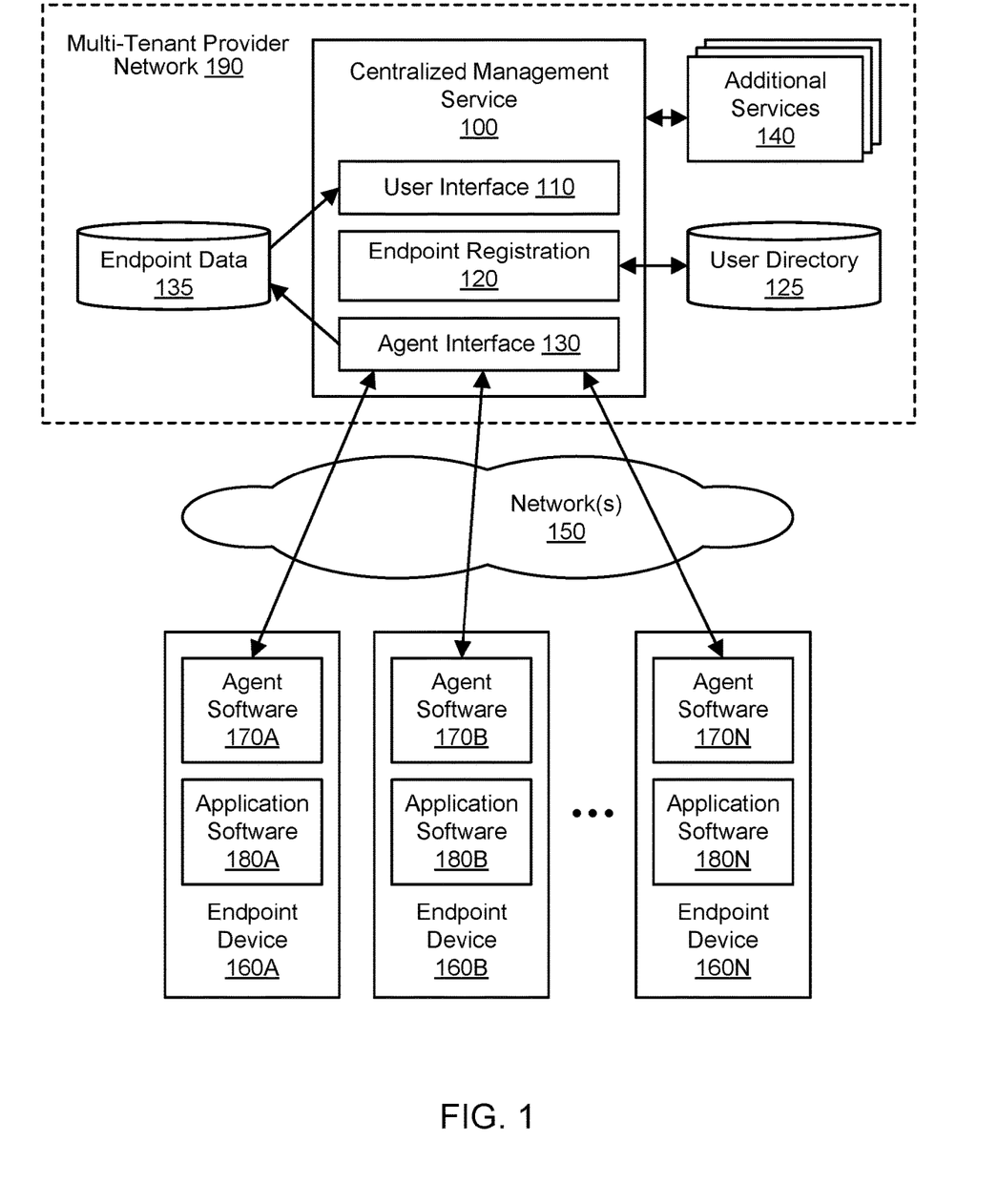
FIG. 1 illustrates an example system environment for centralized management of remote endpoint devices, including a centralized management service in a multi-tenant provider network that communicates with agent software on endpoint devices, according to one embodiment.

FIG. 1 illustrates an example system environment for centralized management of remote endpoint devices, including a centralized management service in a multi-tenant provider network that communicates with agent software on endpoint devices, according to one embodiment. A centralized management service 100 in a provider network 190 may manage a set of computing devices 160A-160N termed endpoints or endpoint devices that are external to that provider network. The endpoints 160A-160N may be associated with one or more client organizations that may differ from an organization that operates the provider network 190. Although three endpoints 160A and 160B through 160N are shown for purposes of illustration and example, any suitable number and configuration of endpoint devices may be managed by the centralized management service 100. The endpoints 160A-160N may be operated by end users, while the centralized management service 100 may be operated by one or more administrative users. The administrators may be associated with the client organizations and/or the organization that operates the provider network 190.

The centralized management service 100 may include components such as a user interface 110, an endpoint registration component 120, and an agent interface 130. Instances of agent software 170A-170N may be installed on the endpoints and may communicate with the agent interface 130. The endpoints 160A-160N may be homogeneous or heterogeneous in their platforms (e.g., the underlying hardware and/or operating system), and the program code for the agent software 170A-170N may vary based on the underlying platform of the corresponding device. However, the various instances of agent software 170A-170N may offer similar functionality across the endpoint devices 160A-160N. The endpoints may also include application software 180A-180N that is executable on the corresponding endpoints. In one embodiment, the sets of installed application software 180A-180N may be managed using the centralized management service 100. The application software may vary from endpoint to endpoint or may be standardized across the endpoints using the centralized management service 100.

The agents 170A-170N may be installed in any suitable manner. In one embodiment, an instance of agent software may be pre-installed on a particular endpoint device prior to its use by and end user. In one embodiment, instances of agent software may be deployed to endpoint devices using the centralized management service 100, e.g., via the agent interface 130. For example, a web-based link to the agent software may be sent to users associated with the endpoint devices 160A-160N, and the users may follow the link to download and install the agent. The agents may be configured for a particular organization that owns or operates the endpoint devices, e.g., to identify their endpoints as belonging to that organization when communicating with the agent interface 130. In one embodiment, an agent may be configured with an IP address, port number, and access credentials in order to communicate with the centralized management service 100; the address, port number, and/or credentials may be associated with a particular client organization, and an endpoint accessing the agent interface 130 may be automatically associated with that organization using such data or metadata.

The endpoint registration component 120 may register endpoint devices, their corresponding instances of agent software, and/or users associated with the endpoint devices. Upon logging in with appropriate access credentials and accessing the user interface 110, an administrator may identify endpoints to be managed. In one embodiment, endpoints with operational and properly configured agents that are associated with the administrator's organization may be detected by the centralized management service 100 and displayed in the user interface 110. An administrator may import users and user groups from any appropriate source, such as a user directory 125. In one embodiment, the user directory may be internal to the provider network 190, e.g., as maintained by another service. In one embodiment, the user directory may be external to the provider network 190, e.g., as implemented within a network associated with the organization that seeks to manage the endpoints 160A-160N. Users in the directory 125 may be linked to particular instances of agent software. In one embodiment, users may also be linked to particular e-mail accounts, e.g., as determined using the directory 125. Links to download the agent software may be provided to the registered e-mail accounts, e.g., with tokens that can be verified by the centralized management service 100 to allow the download. An instance of the agent software may register itself with the centralized management service 100 using its particular token along with the access credentials (e.g., account name and password) for the organization's domain.

The user interface 110 may represent a console for managing the endpoints 160A-160N. The user interface 110 may include a graphical user interface (GUI), command-line interface (CLI), voice-enabled interface, touch-enabled interface, or any other suitable interface. An administrator may enter suitable input into the user interface 110 to select endpoints to manage, deploy configuration changes to selected endpoints (e.g., a subset of endpoints based on group assignments), deploy application software to selected endpoints (e.g., a subset of endpoints based on group assignments), request status updates from endpoints, manage endpoint registration and endpoint groups, and other appropriate tasks. The user interface 110 may also display endpoint data 135 collected from the various endpoints 160A-160N via the agent software 170A-170N. The endpoint data 135 may include telemetry data such as status updates, health information, and other information descriptive of the endpoint devices. Further examples of endpoint data 135 are discussed below with respect to FIG. 3.

Figure 9:
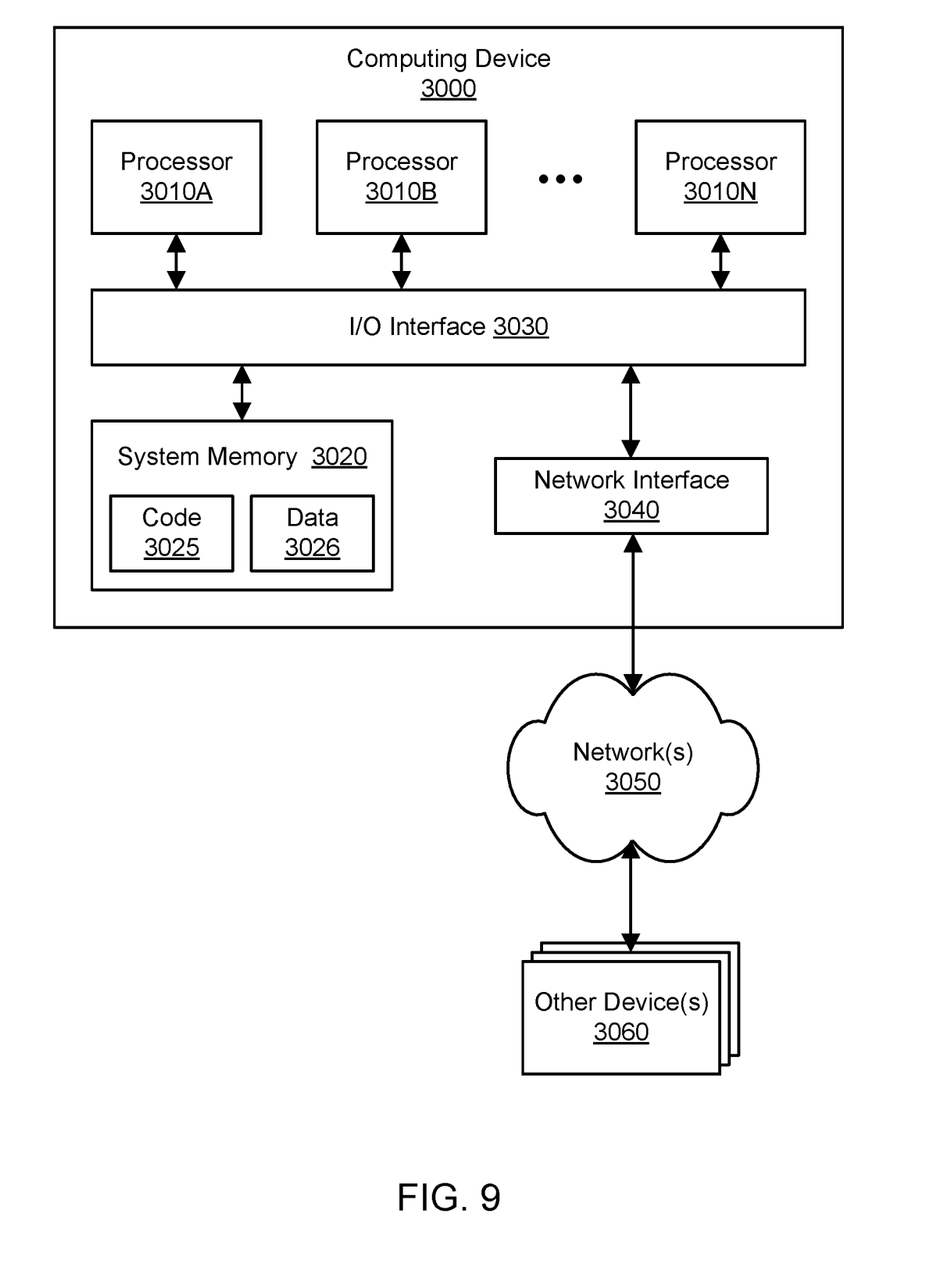
FIG. 9 illustrates an example computing device that may be used in some embodiments.

The centralized management service 100 may be implemented using one or more computing devices referred to as centralized management instances. Any of the centralized management instances may be implemented using the example computing device 3000 as shown in FIG. 9. In various embodiments, portions of the described functionality of the job centralized management service 100 may be provided by the same computing device or by any suitable number of different computing devices. If any of the components of the centralized management service 100 are implemented using different computing devices, then the components and their respective computing devices may be communicatively coupled, e.g., via a network. Each of the illustrated components may represent any combination of software and hardware usable to perform their respective functions. It is contemplated that the centralized management service 100 may include additional components not shown, fewer components than shown, or different combinations, configurations, or quantities of the components shown.

Any of the endpoint devices 160A-160N may represent one or more computing devices, such as the example computing device 3000 illustrated in FIG. 9. The endpoint devices 160A-160N may be communicatively coupled to the centralized management service 100 via one or more public and/or private networks 150. In one embodiment, the instances of agent software 170A-170N and the centralized management service 100 convey network-based service requests to each other via the one or more networks 150. In various embodiments, the network(s) 150 may encompass any suitable combination of networking hardware and protocols necessary to establish network-based communications between the endpoint devices 160A-160N and the centralized management service 100. For example, the network(s) 150 may generally encompass the various telecommunications networks and service providers that collectively implement the Internet. The network(s) 150 may also include private networks such as local area networks (LANs) or wide area networks (WANs) as well as public or private wireless networks. For example, both the endpoint devices 160A-160N and the centralized management service 100 may be respectively provisioned within enterprises having their own internal networks. In such an embodiment, the network(s) 150 may include the hardware (e.g., modems, routers, switches, load balancers, proxy servers, etc.) and software (e.g., protocol stacks, accounting software, firewall/security software, etc.) necessary to establish a networking link between the endpoint devices 160A-160N and the Internet as well as between the Internet and the centralized management service 100. It is noted that in some embodiments, the endpoint devices 160A-160N may communicate with the centralized management service 100 using a private network rather than the public Internet.

The centralized management service 100 may be implemented in a provider network 190. The provider network 190 may include a network set up by an entity such as a business or a public-sector organization to provide one or more services and/or resources (such as various types of network-accessible computing or storage) accessible via the Internet and/or other networks to a distributed set of clients. The provider network 190 may include a plurality of services whose functionality may be invoked on behalf of clients. As shown in the example of FIG. 1, the services may include the centralized management service 100 as well as additional services 140. As will be described in greater detail below, the additional services 140 may include one or more marketplace services permitting the purchase or lease of software, one or more virtual private network (VPN) and/or virtual private cloud (VPC) services offering secure connections to resources, one or more computing virtualization services for hosting virtual compute instances or desktops, one or more storage virtualization services for offering various types of storage to clients, and other suitable types of functionality. The various services of the provider network 190 may be integrated via service interfaces. For example, one service may invoke the functionality of another service using a request sent via an application programming interface (API) associated with the called service. The called service may then perform one or more tasks based (at least in part) on the API call and potentially return a response to the calling service. In this manner, services may be chained together in a hierarchy to perform complex tasks. In some embodiments, the services may be configured to generate network-based service requests according to a Representational State Transfer (REST)-style network-based services architecture, a document- or message-based network-based services architecture, or another suitable network-based services architecture. In at least some embodiments, the services may provision, mount, and configure storage volumes implemented at storage services within the provider network. Any of the services may be implemented using one or more instances, e.g., virtual compute instances hosted using the resources of the provider network 190 and implemented by the example computing device 3000 illustrated in FIG. 9. Because one or more of the services may be used by (or invoked on behalf of) a plurality of clients at any given time (e.g., using one or more instances of each service), the provider network 190 may offer multi-tenancy and may be referred to as a multi-tenant provider network.

The provider network 190 may include a plurality of resources that are offered to clients. The resources of the provider network 190 may include compute instances, storage instances, and so on. The provider network 190 may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 190 in different embodiments, including general purpose or special purpose computer servers, storage devices, network devices, and the like. Because resources of the provider network 190 may be under the control of multiple clients (or tenants) simultaneously, the provider network may be said to offer multi-tenancy and may be termed a multi-tenant provider network. The provider network 190 may include additional components not shown, fewer components than shown, or different combinations, configurations, or quantities of the components shown.

The resources offered by the provider network 190 may vary in their respective configurations. The configuration of a computing resource may include its instance type, hardware capabilities (e.g., type and number of processor cores, type and number of virtual CPUs, type and amount of memory and storage, presence or absence of specialized coprocessors such as a graphics processing unit (GPU), presence or absence of particular application-specific integrated circuits (ASICs) or field-programmable gate arrays (FPGAs), and so on), software configuration (e.g., operating system type and configuration, application type and configuration, and so on), and/or other suitable characteristics. For example, the provider network 190 may include a set of compute instances (physical compute instances and/or virtual compute instances) of different compute instance types, where the compute instance types may vary in the capabilities and features of their processor resources, memory resources, storage resources, network resources, and so on, and potentially in their cost to clients as well. The configuration of a computing resource may impact the performance of that resource for executing a particular task, such that resources having different configurations may vary in performance (e.g., processor performance, execution time, memory usage, storage usage, network usage, energy usage, and so on) for the same or similar tasks. The resources offered by the provider network 190 may also vary in their respective costs that are assessed to clients for reserving and/or using the resources. In one embodiment, the costs may vary by hardware configuration as well as by purchasing mode. Additionally, the resources offered by the provider network 190 may vary in their availability at particular times.

In some embodiments, an operator of the provider network 190 may implement a flexible set of resource reservation, control, and access interfaces for clients. For example, a resource manager associated with the provider network 190 may implement a programmatic resource reservation interface (e.g., via a web site or a set of web pages) that allows clients and/or internal components to learn about, select, purchase access to, and/or reserve resources (e.g., compute instances) offered by the provider network 190. Such an interface may include capabilities to allow browsing of a resource catalog and provide details and specifications of the different types or sizes of resources supported, the different reservation types or modes supported, pricing models, and so on. The provider network 190 may support several different purchasing modes (which may also be referred to herein as reservation modes) in various embodiments: for example, long-term reservations, on-demand resource allocation, or spot-price-based resource allocation.

Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: e.g., a resource instance that was previously allocated to the client may be reclaimed by the resource manager and may be allocated to some other client that is willing to pay a higher price. Other purchasing modes or combinations of modes may be implemented by the resource manager in some embodiments.

Figure 2:
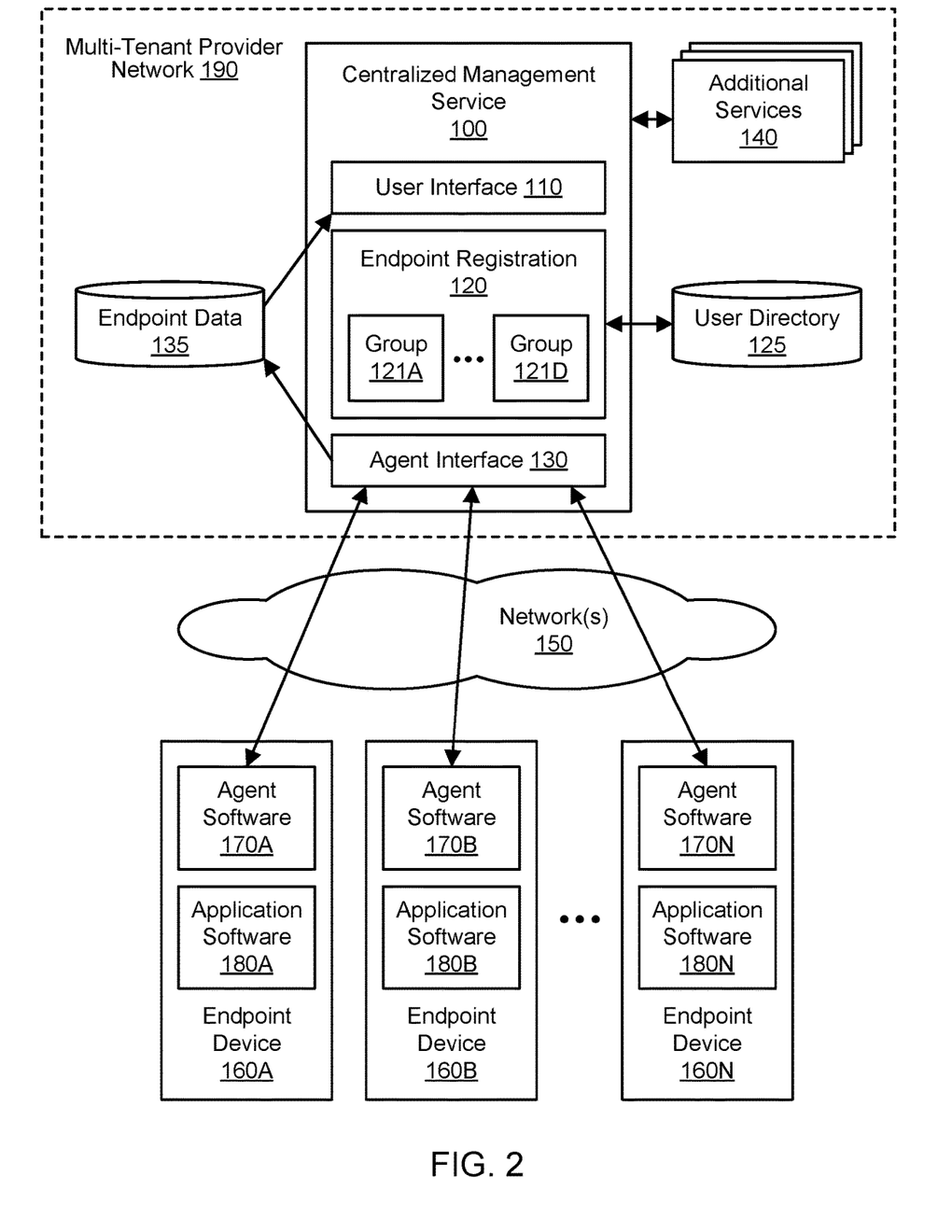
FIG. 2 illustrates further aspects of the example system environment for centralized management of remote endpoint devices, including assignment of endpoint devices to groups for ease of management, according to one embodiment.

FIG. 2 illustrates further aspects of the example system environment for centralized management of remote endpoint devices, including assignment of endpoint devices to groups for ease of management, according to one embodiment. In one embodiment, endpoints may be assigned to groups 121A-121D for ease of centralized management. Although groups 121A-121D are shown for purposes of illustration and example, any suitable number and configuration of groups may be used. In one embodiment, a particular endpoint associated with an organization may be assigned to zero, one, or multiple groups at a given time. Endpoints associated with a particular operating system, device type (e.g., desktop computer, laptop computer, mobile device, etc.), location (geographical or within a network topography), organizational division, user, software configuration, or other key trait may be assigned to an appropriate group that shares that trait. In one embodiment, groups may be created and endpoints may be assigned to groups based (at least in part) on user input from an administrator to the user interface 110. In one embodiment, groups may be automatically created and endpoints may be automatically assigned to groups based (at least in part) on endpoint data 135 collected from the endpoints 160A-160N via their agents 170A-170N. A management task initiated through the centralized management service 100 may be applied specifically to one or more groups of endpoints while excluding other endpoints not in those one or more groups. Similarly, endpoint data 135 may be viewed only for particular groups, e.g., based on user input to the user interface 110 to drill down from a view of all endpoints into a subset of endpoints that share a particular trait.

Figure 3:
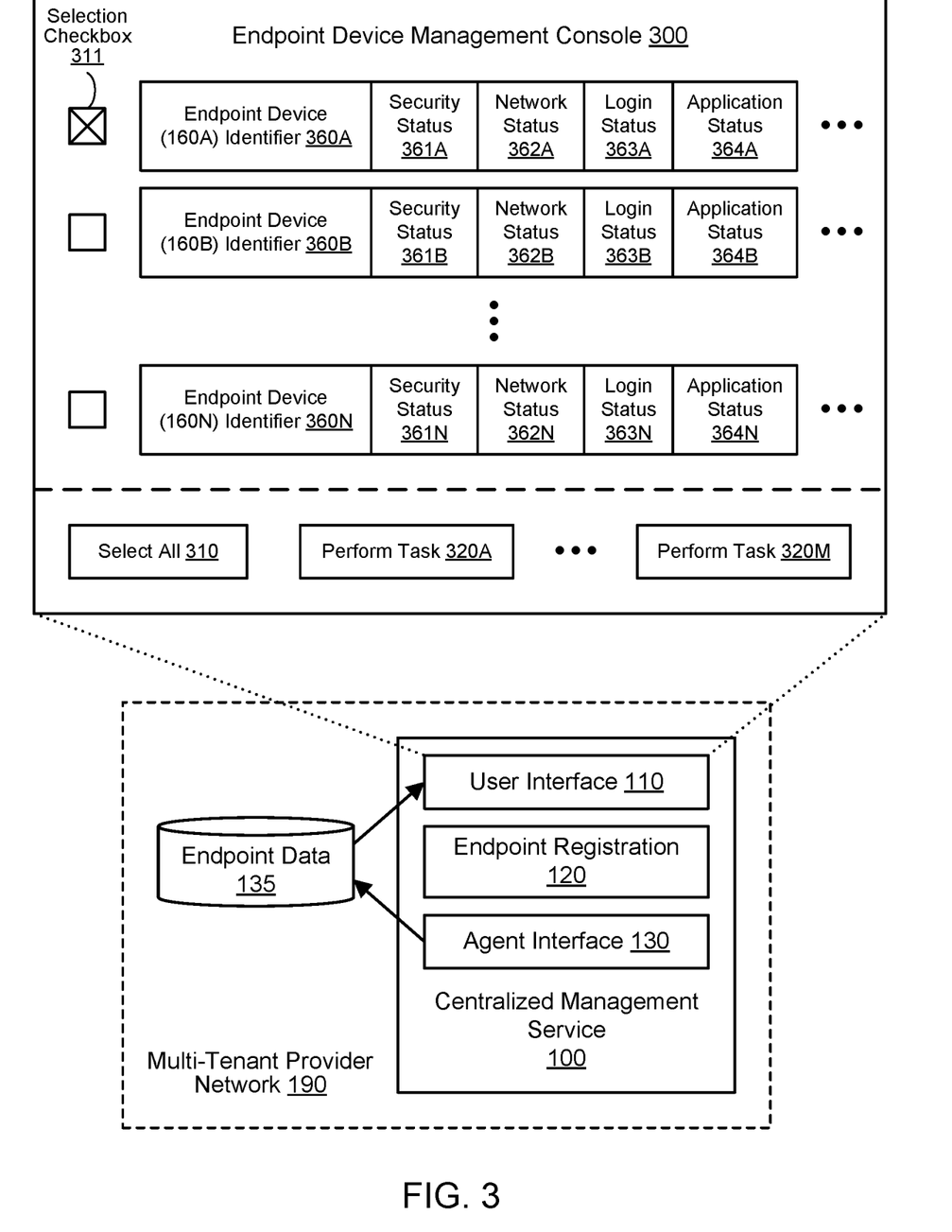
FIG. 3 illustrates further aspects of the example system environment for centralized management of remote endpoint devices, including a management console displaying endpoint device status information, according to one embodiment.

FIG. 3 illustrates further aspects of the example system environment for centralized management of remote endpoint devices, including a management console displaying endpoint device status information, according to one embodiment. As discussed above, the user interface 110 may present endpoint data 135 collected from the various endpoints 160A-160N via the agent software 170A-170N. The endpoint data 135 may include various types of status updates, health information, and other information descriptive of the endpoint devices. For example, the endpoint data 135 may include the IP address or other network address of the endpoint, whether the endpoint is protected by a firewall, whether the endpoint is protected by anti-malware or antivirus software, the identities of any users who are logged in, performance metrics such as network health, the identities of application software currently in use, the status of software installation or deletion tasks, and other suitable telemetry data.

As shown in the example of FIG. 3, the user interface may include a window or other GUI display element representing an endpoint device management console 300. The console 300 may display all or part of the endpoint data 135 descriptive of the endpoints 160A-160N and collected by the agents 170A-170N. For example, the console 300 may display a set of endpoint device identifiers 360A-360N that correspond to the endpoint devices 160A-160N. The device identifiers 360A-360N may represent device names, alphanumeric labels, IP addresses, and/or other suitable information that may uniquely identify particular endpoint devices within some context associated with the client organization. Each device identifier may be associated with additional endpoint data in the console 300. The device identifiers 360A-360N may be displayed with corresponding security status indicators 361A-361N. The security status indicators 361A-361N may represent firewall information, malware information, antivirus information, and so on, for particular endpoints. For example, the security status indicator for a particular endpoint may represent an "all clear" status if the firewall is operational and no malware or viruses have been detected. The device identifiers 360A-360N may be displayed with corresponding network status indicators 362A-362N. The network status indicators 362A-362N may represent a network health of the corresponding endpoints. The device identifiers 360A-360N may be displayed with corresponding login status indicators 363A-363N. The login status indicators 363A-363N may represent whether the registered user for the endpoint is currently logged in or, if not, how recently the user was logged in. The device identifiers 360A-360N may be displayed with corresponding application status indicators 364A-364N. The application status indicators 364A-364N may represent a status of application use, application installation, application updating, or application deletion. As indicated by the ellipses, the device identifiers 360A-360N may be displayed with other types of endpoint data, as appropriate.

The console 300 may also be used to apply management tasks to one or more endpoints. In various embodiemnts, a button, contextual menu, or other interface element may be accessed for a particular endpoint based (at least in part) on user input. For example, interface elements 320A through 320M may represent buttons for performing various management tasks. A press of the button, a selection of an item from the contextual menu, or any other appropriate input may represent a command to initiate a management task such as deploying software to an endpoint or deploying a configuration change to an endpoint. In one embodiment, a management task may be initiated for selections of multiple endpoints (e.g., based on group affiliation) and/or individual endpoints. As shown in the example of FIG. 3, interface elements such as radio buttons or checkboxes, e.g., checkbox 311, may be used to select individual endpoints as the target of management tasks 320A-320M. In one embodiment, a set of endpoints (e.g., associated with a group and displayed in the window 300) may be selected at once using an interface element such as the select all button 310.

Figure 4:
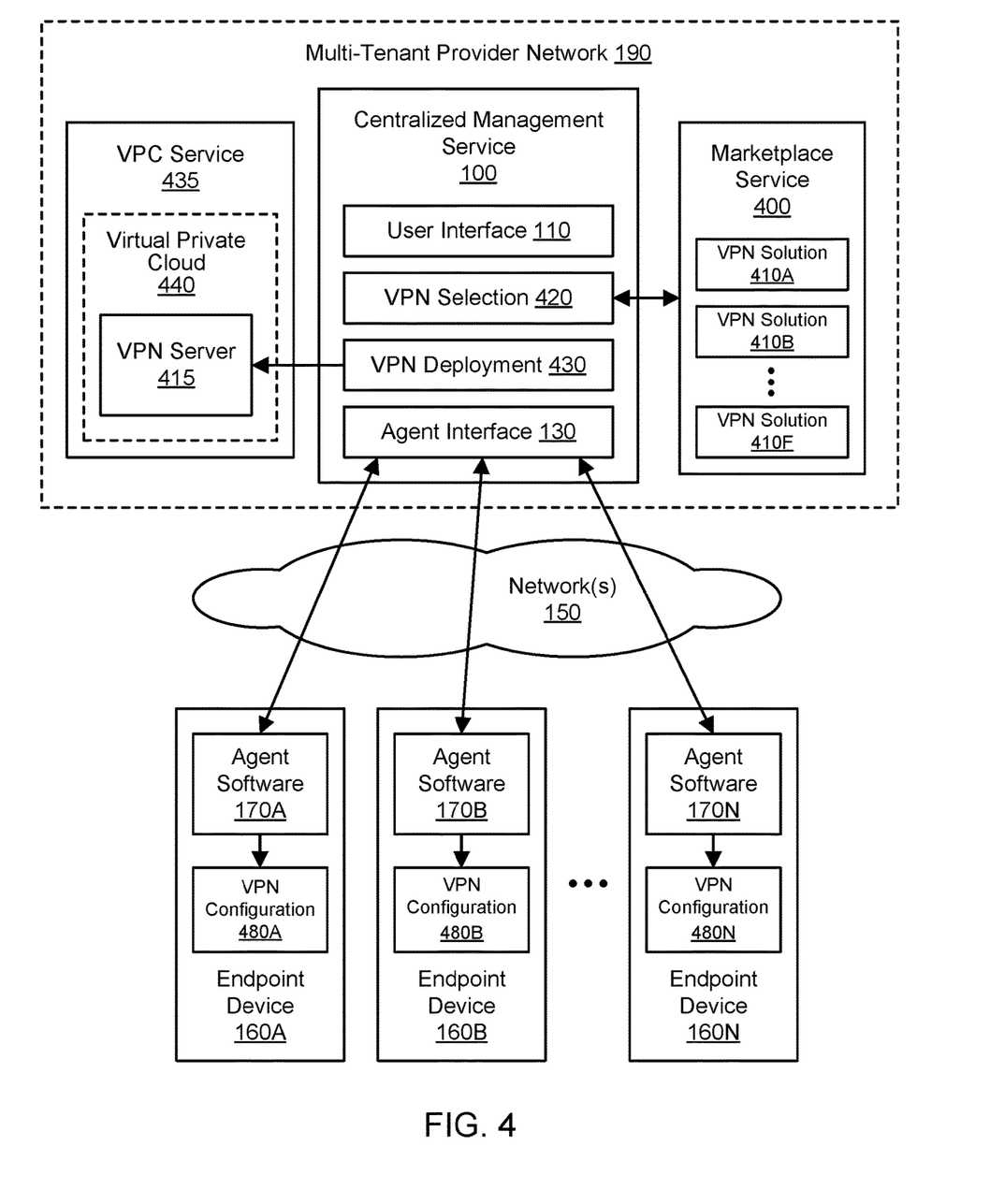
FIG. 4 illustrates further aspects of the example system environment for centralized management of remote endpoint devices, including selection and deployment of a VPN server using integration with a marketplace service in the multi-tenant provider network, according to one embodiment.

FIG. 4 illustrates further aspects of the example system environment for centralized management of remote endpoint devices, including selection and deployment of a VPN server using integration with a marketplace service in the multi-tenant provider network, according to one embodiment. In one embodiment, the centralized management service 100 may be integrated with a marketplace service 400 (representing one of the additional services 140). The marketplace service 400 may make various product offerings for software available to potential customers. A marketplace customer, such as an administrator associated with the centralized management service 100, may browse a marketplace, select software, and enter into an agreement to purchase or license the software, e.g., via a subscription with a marketplace partner. In one embodiment, particular software packages may be grouped according to product category. For example, the marketplace service 400 may offer differing virtual private network (VPN) solutions 410A-410F. The VPN solutions 410A-410F may be offered by various third-party publishers (referred to as marketplace partners) and potentially also by the organization that operates the provider network 190. The VPN solutions 410A-410F may include VPN servers. In one embodiment, a VPN selection component 420 of the centralized management service 100 may be integrated with the marketplace service 400 to permit an administrator to select a VPN solution or server.

A VPN server 410 selected from the marketplace may be deployed for use with the endpoints 160A-160N. In one embodiment, a VPN deployment component 430 of the centralized management service 100 may permit an administrator to deploy a VPN solution or server. In one embodiment, the VPN deployment component 430 may launch a setup wizard for the selected VPN server 410, e.g., for collecting information from the administrator such as access credentials. In one embodiment, as shown in FIG. 4, the VPN server 410 may be deployed within the provider network 190, e.g., based on input from an administrator of the centralized management service 100. As also shown in FIG. 4, the VPN server 410 may be deployed within a secure set of resources in the provider network 190 termed a virtual private cloud (VPC). In one embodiment, the VPC 440 may be implemented by a VPC service 435 of the provider network 190; the VPC service may represent one of the additional services 140. In one embodiment, the VPN server 410 may instead be deployed outside the provider network 190, e.g., in a network associated with the organization that seeks to manage the endpoints 160A-160N. In one embodiment, rather than select a VPN server 410 from the marketplace 400, an administrator may choose to implement the VPN using a VPN service of the provider network 190. Along with deploying the VPN server, the centralized management service 100 may deploy VPN configurations 480A-480N to the endpoints via the agent software 170A-170N. The VPN configurations 480A-480N may include a network address of the VPN server and suitable access credentials. In various embodiments, the VPN configurations 480A-480N may be deployed to the endpoints manually (e.g., based on an administrator's command) or automatically. Similarly, the centralized management service 100 may deploy configuration changes for security software (e.g., firewall, antivirus, anti-malware, and so on) using the agents on the endpoints.

Figure 5:
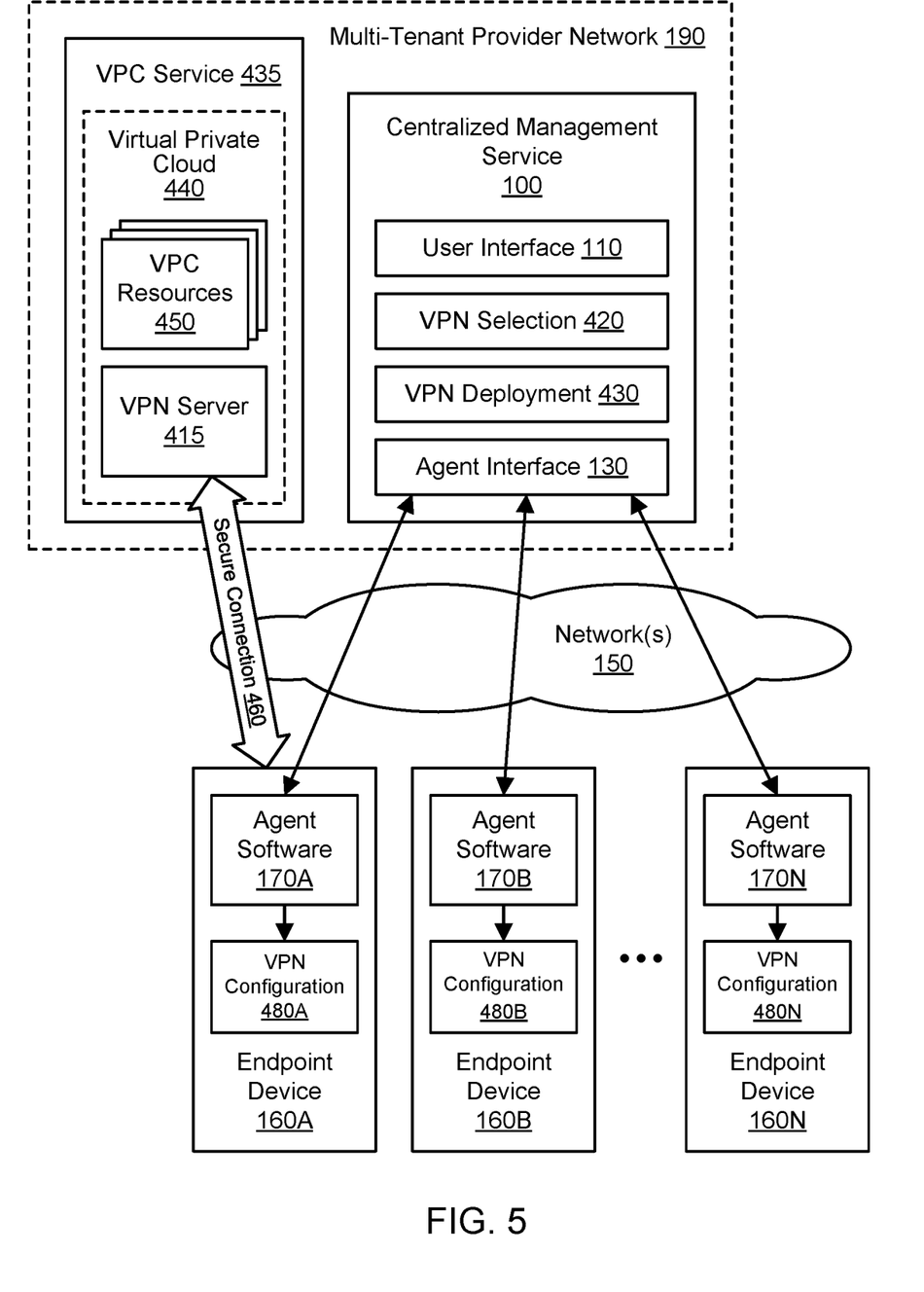
FIG. 5 illustrates further aspects of the example system environment for centralized management of remote endpoint devices, including a secure connection between an endpoint device and a VPN server in a VPC in the multi-tenant provider network, according to one embodiment.

FIG. 5 illustrates further aspects of the example system environment for centralized management of remote endpoint devices, including a secure connection between an endpoint device and a VPN server in a VPC in the multi-tenant provider network, according to one embodiment. The VPN configuration 480A-480N may permit the endpoint devices 160A-160N to securely tunnel into the VPN server 415. As shown in the example of FIG. 5, the endpoint 160A may establish a secure connection 460 to the VPN server 415 of the VPC 440 using the VPN configuration 480A. In one embodiment, a user of the endpoint 160A may initiate the secure connection 460 through the agent 170A. The agent 170A may send a connection request to the centralized management service 100, which may then check on the connection health of the endpoint, perform authorization and authentication tasks (e.g., using the user directory 125), and either accept or reject the request. The secure connection 460 may represent a session between the endpoint and the VPN server 415 for a particular amount of time.

In one embodiment, the VPN server 415 may be deployed within a virtual private cloud (VPC) 440 representing a virtual network, e.g., within the larger provider network 190. The VPC 440 may be isolated from other resources and VPCs within the provider network 190 and may have its own range of IP addresses referred to as a subnet; resources 450 of the provider network may be launched into the subnet. In one embodiment, the isolation between one VPC user and other users (e.g., other VPC users as well as other public cloud users) may be achieved via allocation of a private IP subnet and a virtual communication construct (e.g., a VLAN or a set of encrypted communication channels) for a particular user. In the VPC 440, resource isolation within the provider network 190 may be implemented by the VPN server 415 securing, via of authentication and encryption, the remote access of the VPC user to the VPC resources 450.

Figure 6:
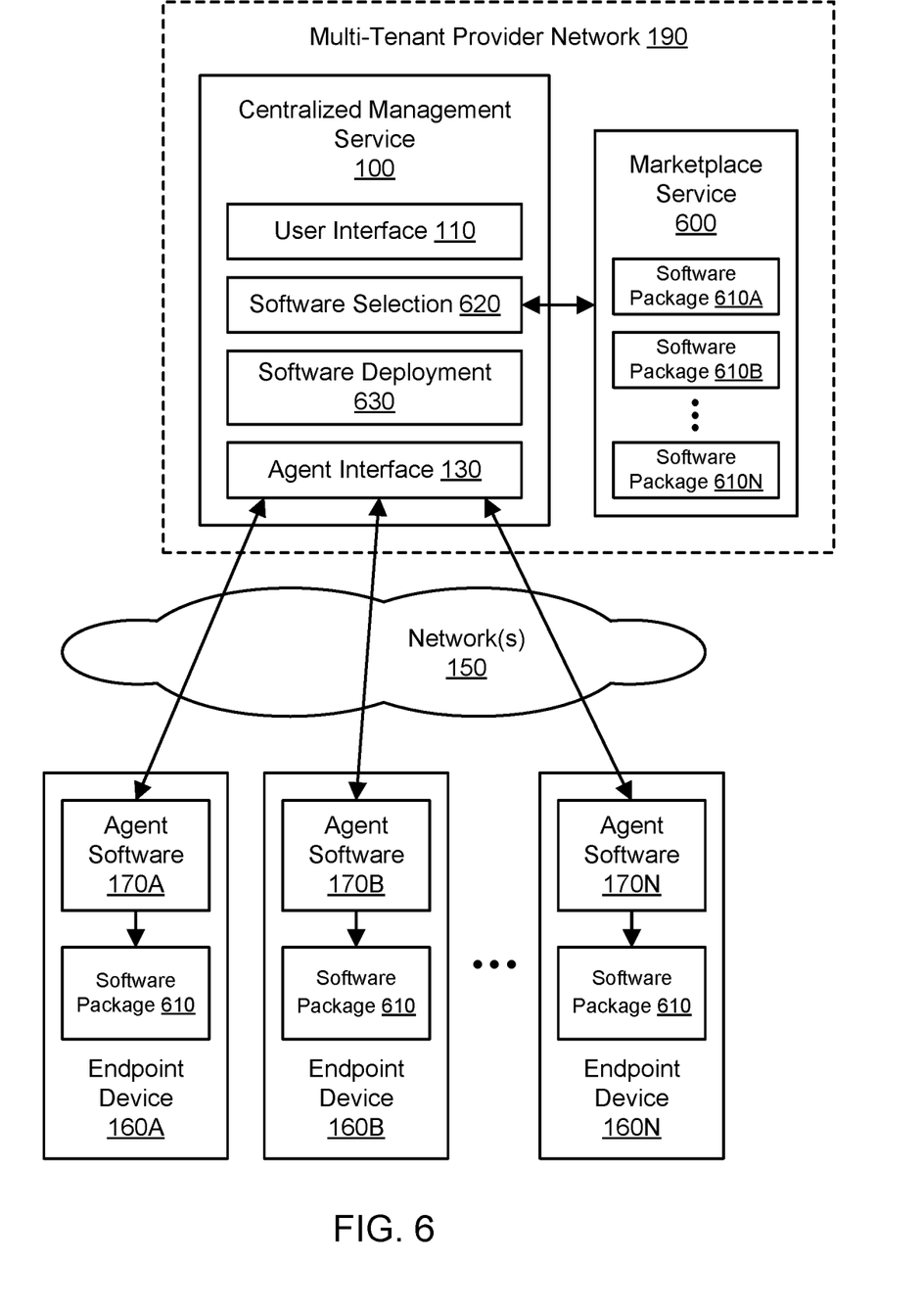
FIG. 6 illustrates further aspects of the example system environment for centralized management of remote endpoint devices, including installation of software on endpoint devices using integration with a marketplace service in the multi-tenant provider network, according to one embodiment.

FIG. 6 illustrates further aspects of the example system environment for centralized management of remote endpoint devices, including installation of software on endpoint devices using integration with a marketplace service in the multi-tenant provider network, according to one embodiment. In one embodiment, the centralized management service 100 may be integrated with a marketplace service 600 (representing one of the additional services 140). The marketplace service 600 may make various product offerings for software available to potential customers. For example, the marketplace service 600 may offer differing software packages 610A-610N. The software packages 610A-610N may be offered by various third-party publishers (referred to as marketplace partners) and potentially also by the organization that operates the provider network 190. For example, the software packages 610A-610N may include antivirus software, antimalware software, firewall software, other security management software, application software, and so on. A marketplace customer, such as an administrator associated with the centralized management service 100, may browse a marketplace, select software, and enter into an agreement to purchase or license the software, e.g., via a subscription with a marketplace partner. In one embodiment, a software selection component 620 of the centralized management service 100 may be integrated with the marketplace service 600 to permit an administrator to select a software package, such that application programming interface (API) calls from the centralized management service to the marketplace service may be used to select the desired software.

A software package 610 selected from the marketplace may be deployed for use with one or more of the endpoints 160A-160N. In one embodiment, a software deployment component 630 of the centralized management service 100 may permit an administrator to deploy the software package 610 to the endpoints. Using the agent software 170A-170N, the software package 610 may be downloaded to the endpoints and installed. In one embodiment, the software package 610 may be downloaded and installed based on user input from an end user of an endpoint, e.g., by selecting the software package from a set of installable applications made available to the user by an administrator. In one embodiment, the software package 610 may be downloaded and installed based on user input from an administrator of the centralized management service 100. Similarly, the centralized management service 100 may deploy application software not purchased from the marketplace 600 using the agents on the endpoints. In one embodiment, the marketplace partner that publishes the software package 610 may prompt the package to be deployed to the endpoint devices 160A-160N. For example, the software package 610 may represent an update to a previously installed software package, and the publisher may push updates to the endpoint devices 160A-160N using their agent software 170A-170N.

Figure 7:
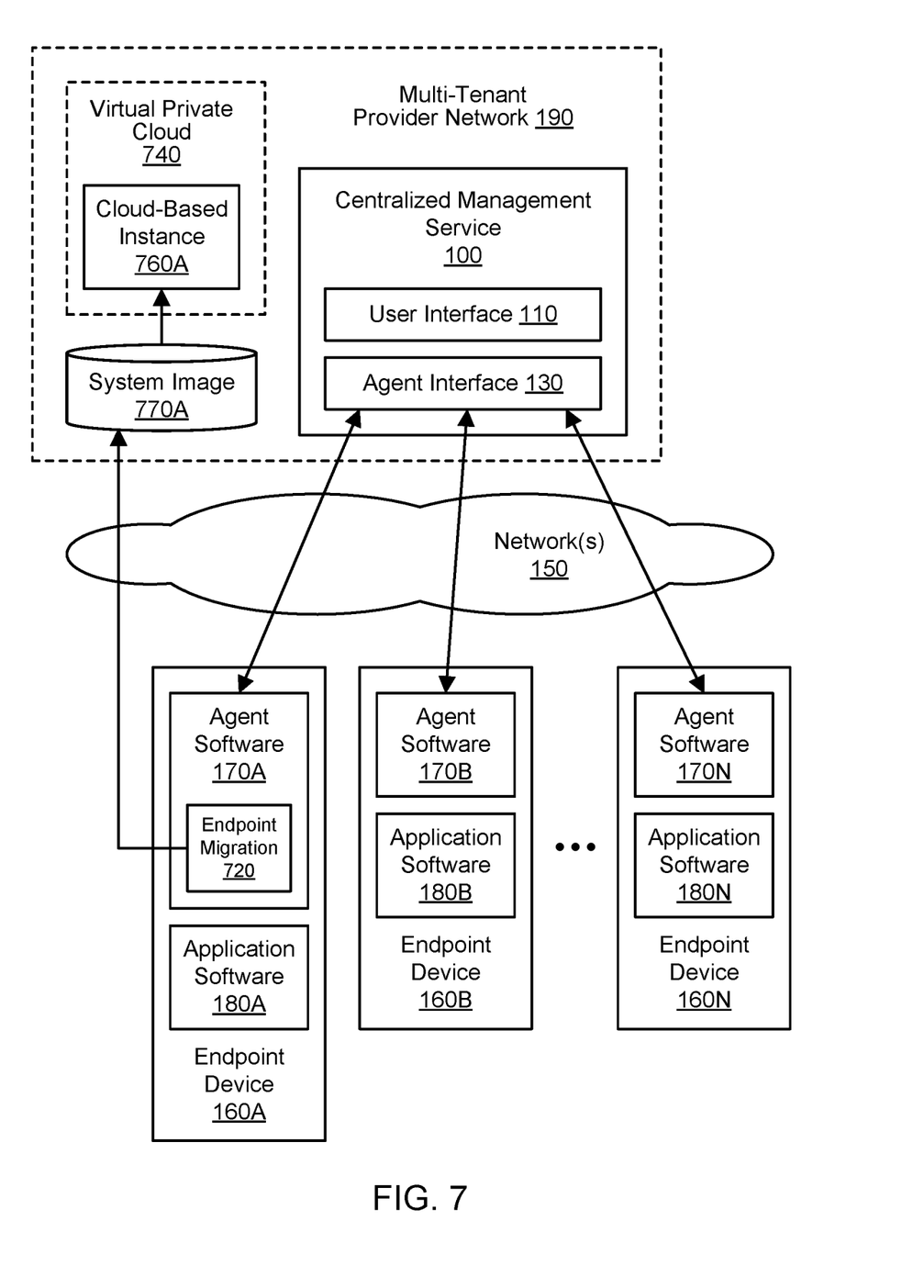
FIG. 7 illustrates further aspects of the example system environment for centralized management of remote endpoint devices, including migration of an endpoint device to resources of the multi-tenant provider network, according to one embodiment.

FIG. 7 illustrates further aspects of the example system environment for centralized management of remote endpoint devices, including migration of an endpoint device to resources of the multi-tenant provider network, according to one embodiment. In one embodiment, the agent software may assist in the migration of endpoints to compute instances hosted in the provider network. For example, the agent software instance 170A may include an endpoint migration component 720. Based (at least in part) on input from an end user of the endpoint 160A, the endpoint migration component 720 may generate a system image 770A of the endpoint. The system image 770A may include an operating system or indication thereof, operating system configuration settings, the set of application software 180A, application software configuration settings, and other user data in persistent storage associated with the endpoint 160A. In one embodiment, the endpoint migration may be initiated after being approved by the centralized management service 100. For example, the centralized management service 100 may determine whether the connection speed between the endpoint and the provider network 190 is sufficient and may approve or deny the migration request accordingly.

The system image 770A may be stored in the provider network 190 using a storage service of the provider network. A virtual compute instance 760A may be provisioned from the provider network 190 for the migration, and the contents of the system image 770A may be used to configure that instance. Upon completion of the migration, the instance 760A may be termed a cloud-based instance and may represent a version of the endpoint device 160A as hosted in the provider network 190. The instance 160A may be accessed by the end user via a network connection, e.g., via display of a virtual desktop on another computing device outside the provider network 190. In one embodiment, the instance 760A may be deployed within a virtual private cloud (VPC) 740 representing a virtual network, e.g., within the larger provider network 190.

Figure 8:
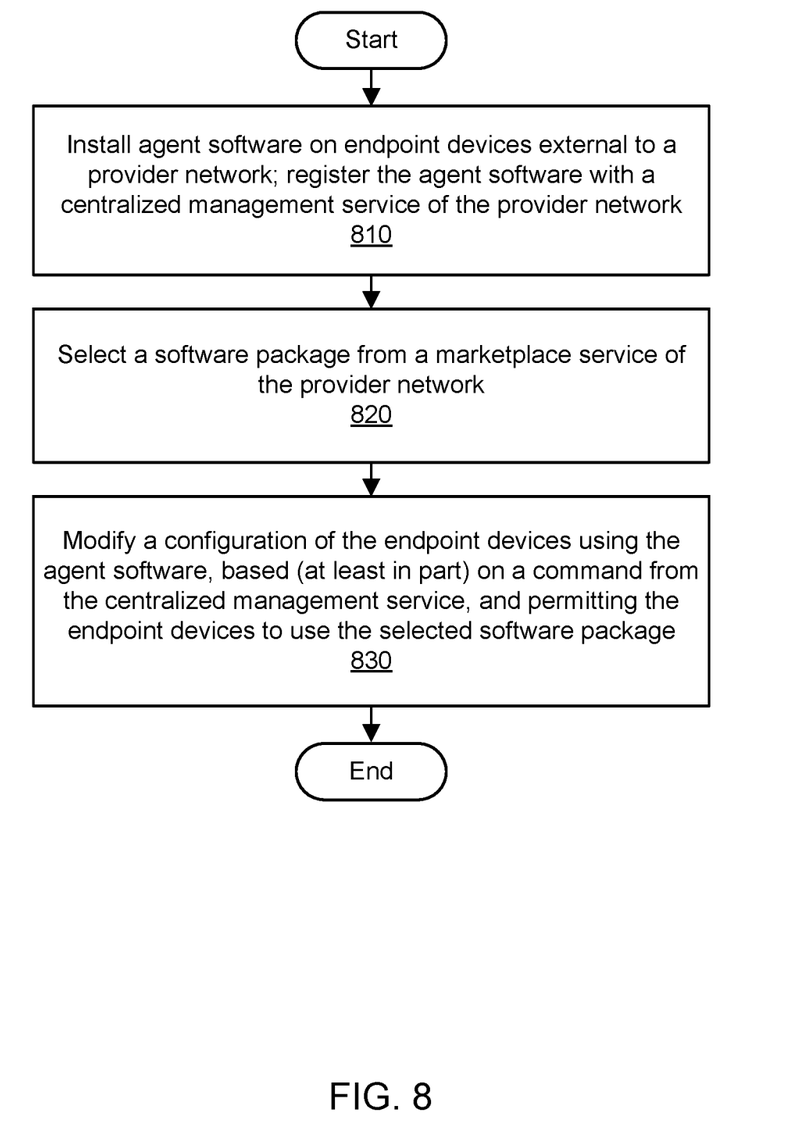
FIG. 8 is a flowchart illustrating a method for centralized management of remote endpoint devices, according to one embodiment.

FIG. 8 is a flowchart illustrating a method for centralized management of remote endpoint devices, according to one embodiment. As shown in 810, agent software may be installed on a plurality of endpoint devices. The endpoint devices may be external to a multi-tenant provider network. The agent software may be communicatively coupled (e.g., over a network) to a centralized management service of the multi-tenant provider network. An instance of the agent software may be registered with the centralized management service and associated with a particular user and/or endpoint device. The agent software executed on an endpoint may provide, to the centralized management service, status information, telemetry data, and other information descriptive of that endpoint.

As shown in 820, a software package may be selected from a marketplace service of the multi-tenant provider network. Software packages may include application software, utility software, networking software, and other suitable software for execution on the endpoint devices or elsewhere. The marketplace service may comprise product offerings for a plurality of software packages, including the selected one. In one embodiment, the marketplace service may be integrated with the centralized management service such that an administrative user of the centralized management service may use a management console to access the marketplace, browse software packages, and purchase or license particular applications. For example, the administrator may select and license a VPN server to which the endpoints can be configured to connect. As another example, the administrator may select and license security management software (e.g., anti-virus or anti-malware software) for execution on the endpoints. As yet another example, the administrator may select and license application software for execution on the endpoints.

As shown in 830, the centralized management service may modify a configuration of at least some of the endpoint devices. To modify the configuration, the centralized management service may send the updated configuration to the agent software on the endpoints. The modified configuration may permit the endpoint devices to use the software package selected in 820. In one embodiment, the modified configuration may represent application software to be installed on the endpoints, thus changing the application configuration of the endpoints. In one embodiment, the modified configuration may represent a VPN configuration to be deployed to the endpoints, e.g., permitting the endpoints to access a deployed VPN server. In one embodiment, the modified configuration may represent a security management configuration to be deployed to the endpoints, e.g., to modify the firewall, anti-virus, or anti-malware protection for the endpoints. The agent software may acknowledge the deployment of the configuration (or installation of software) to the centralized management service.

Illustrative Computer System

In at least some embodiments, a computer system that implements a portion or all of one or more of the technologies described herein may include a computer system that includes or is configured to access one or more computer-readable media. FIG. 9 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multi-processor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms.

These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a centralized management service of a multi-tenant provider network, wherein the centralized management service is implemented using a centralized management instance comprising at least one processor and a memory storing program instructions, wherein the centralized management instance is communicatively coupled to instances of agent software on a plurality of endpoint devices external to the multi-tenant provider network, and wherein the program instructions are executable by the at least one processor of the centralized management instance to:
select a virtual private network (VPN) server from a marketplace service of the multi-tenant provider network, wherein the marketplace service comprises product offerings for a plurality of VPN servers;
deploy the VPN server in a virtual private cloud (VPC) comprising resources in the multi-tenant provider network;
send, to the agent software of the endpoint devices, information indicative of a VPN configuration usable to contact the VPN server; and
establish a secure connection between the VPN server and the instances of agent software based at least in part on the VPN configuration.

2. The system as recited in claim 1, wherein the program instructions are further executable by the at least one processor of the centralized management instance to:
select a software package from the marketplace service of the multi-tenant provider network; and
send the software package to the agent software of one or more of the endpoint devices;
receive, from the agent software of the one or more of the endpoint devices, an indication that the software package is installed on the one or more of the endpoint devices.

3. The system as recited in claim 1, wherein the program instructions are further executable by the at least one processor of the centralized management instance to:
receive, from the agent software, a system image of the particular one of the endpoint devices; and
migrate the particular one of the endpoint devices to one or more computational resources of the multi-tenant provider network based at least in part on the system image.

4. The system as recited in claim 1, wherein the program instructions are further executable by the at least one processor of the centralized management instance to:
receive information descriptive of the endpoint devices from the agent software; and
present the information descriptive of the endpoint devices in a graphical user interface.

5. A computer-implemented method, comprising:
receiving, at a centralized management service of a multi-tenant provider network, information indicative of installation of instances of agent software on a plurality of endpoint devices external to the multi-tenant provider network;
selecting a software package from a marketplace service of the multi-tenant provider network, wherein the marketplace service comprises product offerings for a plurality of software packages;
determining one or more of the endpoint devices associated with the software package;
sending, from the centralized management service to the agent software of the one or more of the endpoint devices, information indicative of a configuration associated with the software package; and
receiving, at the centralized management service from the agent software of the one or more of the endpoint devices, information indicative of deployment of the configuration on the one or more of the endpoint devices.

6. The method as recited in claim 5, wherein the software package comprises a virtual private network (VPN) server, and wherein the configuration permits the endpoint devices to establish a secure connection with the VPN server.

7. The method as recited in claim 6, further comprising:
deploying the VPN server in a virtual private cloud (VPC) comprising resources in the multi-tenant provider network.

8. The method as recited in claim 5, further comprising:
sending, from the centralized management service to the agent software of the one or more of the endpoint devices, an installer associated with the software package; and
receiving, at the centralized management service from the agent software of the one or more of the endpoint devices, information indicative of installation of the software package on the one or more of the endpoint devices.

9. The method as recited in claim 5, further comprising:
migrating a particular one of the endpoint devices to one or more computational resources of the multi-tenant provider network based at least in part on a system image of the particular one of the endpoint devices, wherein the system image is generated using the agent software of the particular one of the endpoint devices.

10. The method as recited in claim 5, further comprising:
receiving, at the centralized management service from the agent software, information descriptive of the endpoint devices; and
presenting the information descriptive of the endpoint devices in a graphical user interface associated with the centralized management service.

11. The method as recited in claim 5, wherein the configuration is associated with security management at the endpoint devices.

12. The method as recited in claim 5, further comprising:
assigning at least some of the endpoint devices to a plurality of groups using the centralized management service, wherein the configuration of at least some of the endpoint devices is modified based at least in part on membership in one or more of the groups.

13. One or more non-transitory, computer-readable storage media storing program instructions that, if executed on or across one or more processors, cause the one or more processors to perform:
    deploying instances of agent software to a plurality of endpoint devices external to a multi-tenant provider network, wherein the agent software is communicatively coupled to a centralized management service of the multi-tenant provider network;
    selecting a software package from a marketplace service of the multi-tenant provider network based at least in part on one or more interactions between the marketplace service and the centralized management service, wherein the marketplace service comprises product offerings for a plurality of software packages; and
    determining one or more of the endpoint devices associated with the software package;
    sending, from the centralized management service to the agent software of the one or more of the endpoint devices, information indicative of a configuration associated with the software package; and
    receiving, at the centralized management service from the agent software of the one or more of the endpoint devices, information indicative of deployment of the configuration on the one or more of the endpoint devices.

14. The one or more non-transitory, computer-readable storage media as recited in claim 13, wherein the software package comprises a virtual private network (VPN) server, and wherein the configuration permits the endpoint devices to establish a secure connection with the VPN server.

15. The one or more non-transitory, computer-readable storage media as recited in claim 14, wherein the program instructions are further computer-executable to perform:
    deploying the VPN server in a virtual private cloud (VPC) comprising resources in the multi-tenant provider network.

16. The one or more non-transitory, computer-readable storage media as recited in claim 13, wherein the program instructions are further computer-executable to perform:
    sending, from the centralized management service to the agent software of the one or more of the endpoint devices, an installer associated with the software package; and
    receiving, at the centralized management service from the agent software of the one or more of the endpoint devices, information indicative of installation of the software package on the one or more of the endpoint devices.

17. The one or more non-transitory, computer-readable storage media as recited in claim 13, wherein the program instructions are further computer-executable to perform:
    migrating a particular one of the endpoint devices to one or more computational resources of the multi-tenant provider network based at least in part on a system image of the particular one of the endpoint devices, wherein the system image is generated using the agent software of the particular one of the endpoint devices.

18. The one or more non-transitory, computer-readable storage media as recited in claim 13, wherein the program instructions are further computer-executable to perform:
    receiving, at the centralized management service from the agent software, information descriptive of the endpoint devices; and
    presenting the information descriptive of the endpoint devices in a graphical user interface associated with the centralized management service.

19. The one or more non-transitory, computer-readable storage media as recited in claim 13, wherein the information indicative of the configuration associated with the software package is sent from the centralized management service to the agent software of the one or more of the endpoint devices based at least in part on a prompt from a publisher of the software package.

20. The one or more non-transitory, computer-readable storage media as recited in claim 13, wherein the program instructions are further computer-executable to perform:
    assigning at least some of the endpoint devices to a plurality of groups using the centralized management service, wherein the configuration of at least some of the endpoint devices is modified based at least in part on membership in one or more of the groups.

* * * * *